US007112745B2

(12) United States Patent
Hatori

(10) Patent No.: US 7,112,745 B2
(45) Date of Patent: Sep. 26, 2006

(54) PROTECTOR COVER FOR TERMINAL GROUP

(75) Inventor: Shouji Hatori, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/995,151

(22) Filed: Nov. 24, 2004

(65) Prior Publication Data

US 2005/0133247 A1 Jun. 23, 2005

(30) Foreign Application Priority Data

Dec. 3, 2003 (JP) ............................ 2003-404938

(51) Int. Cl.
*H02G 15/02* (2006.01)

(52) U.S. Cl. ................ 174/71 R; 174/72 R; 174/72 A; 174/74 R; 174/74 A

(58) Field of Classification Search .............. 174/74 R, 174/74 A, 76, 78, 79, 80–82, 84 R, 84 C, 174/85–87, 88 R; 439/148–149, 892
See application file for complete search history.

(56) References Cited

U.S. PATENT DOCUMENTS 4,647,717 A * 3/1987 Uken ........................ 174/84 C
4,732,628 A * 3/1988 Dienes ........................ 156/48
4,751,350 A * 6/1988 Eaton .......................... 174/87
5,164,546 A * 11/1992 Kumagai .................... 174/135
5,252,779 A * 10/1993 DiRienzo ..................... 174/87
5,367,126 A * 11/1994 Kikuchi .................... 174/71 R
5,672,846 A * 9/1997 Marie-Louise Debbaut . 174/84 R
6,107,573 A * 8/2000 Uchiyama et al. ........ 174/75 R
6,156,976 A * 12/2000 Kawamura et al. ........... 174/76
6,246,001 B1 * 6/2001 Fukui .......................... 174/78
6,359,226 B1 * 3/2002 Biddell et al. ............ 174/74 A
6,630,625 B1 * 10/2003 Akashi et al. ............ 174/72 A
6,730,847 B1 * 5/2004 Fitzgerald et al. ........ 174/77 R
2001/0010985 A1 * 8/2001 Kasai ......................... 439/638
2005/0106934 A1 * 5/2005 Hatori ........................ 439/501
2005/0153576 A1 * 7/2005 Fukuda ........................ 439/34

FOREIGN PATENT DOCUMENTS

JP 07-141921 A * 6/1995
JP 8-148201 6/1996
JP 10-304537 A * 11/1998
JP 2002-362257 A * 12/2002

OTHER PUBLICATIONS

English language Abstract of JP8-148201.

* cited by examiner

*Primary Examiner*—William H. Mayo, III
(74) *Attorney, Agent, or Firm*—Greenblum & Bernstein, P.L.C.

(57) ABSTRACT

A protector cover that protects multiple collected wire terminal group splices while reducing the space occupied by the wire harness by locating the protector cover on the wire harness. The protector cover encloses solder joined terminal group splices formed at the ends of branch wires that separate from trunk wires of a wire harness. Multiple caps, each into which a terminal group splice is inserted, are formed at intervals on one or both sides of a planar support member, and a taping flange is formed as an extension at the open end of the caps. A terminal group splice is inserted into each cap and secured therein by a tape wrapping that encompasses the taping flange and the branch wires. The planar support member is then attached to the circumference of the trunk wires through a tape wrapping.

15 Claims, 9 Drawing Sheets

FIG.10A
PRIOR ART
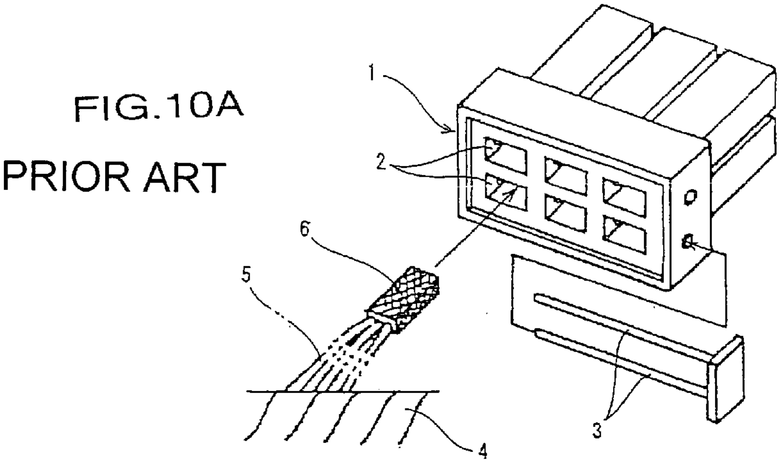
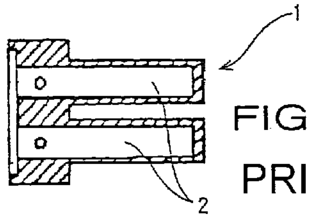
FIG.10B
PRIOR ART
FIG.10C
PRIOR ART
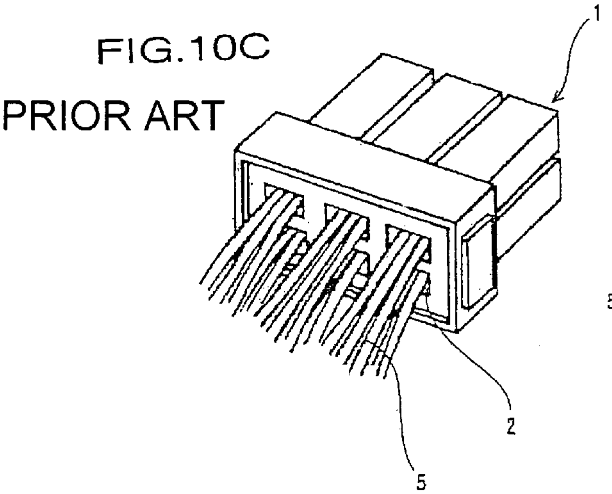
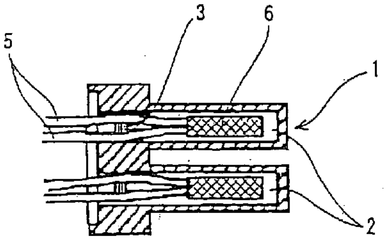
FIG.10D
PRIOR ART

PROTECTOR COVER FOR TERMINAL GROUP

RELATED APPLICATIONS

The present disclosure relates to subject matter contained in priority Japanese Application No. 2003-404938, filed on Dec. 3, 2003, which is herein expressly incorporated by reference in its entirety.

BACKGROUND OF THE INVENTION

1. Field of the Invention

The present invention relates to a protective cover placed over a wire splice, and more particularly to a protective insulated cover provided over collected solder joined ends of multiple electrical wires.

2. Description of the Background Information

As shown in FIGS. 10A–10D, the prior art includes a splice case 1, which is described by Japanese Kokai (Laid Open) Patent H8-148201. Splice case 1 serves as an insulated protective housing covering the solder joined terminal ends of multiple wires of an automotive wire harness. Splice case 1 includes multiple compartments 2, each housing a terminal splice 6 including the solder joined ends of wires 5 which separate from trunk wires 4. After each terminal splice 6 is inserted into a respective compartment 2, stopper pin 3 is inserted between wires 5 to lock each terminal splice 6 in splice case 1.

Splice case 1, however, is unable to flex due to its construction of hard synthetic resin, thus creating a problem in that a large amount of space is required to accommodate splice case 1, with wire terminals 6 installed therein, in the vicinity of trunk wires 4. There is also the possibility that splice case 1, which is constructed of a hard synthetic resin, may interfere with and cause damage to trunk wires 4.

SUMMARY OF THE INVENTION

In consideration of the above noted shortcomings, the present invention provides a protector cover capable of protecting the collected group spliced terminal ends of multiple wires, and of reducing the amount of space required to locate the spliced terminal ends along the trunk wires.

To solve the above noted problems in the prior art, the present invention provides a protector cover that protects multiple collected terminal group splices, each of the group splices being formed by the solder joined ends of core conductors of electrical wires branching off of the trunk wires of an automotive wire harness. Multiple caps are attached, in alignment, to one or both sides of a planar support member, each of the caps provided over one of the terminal group splices. A taping flange extends from the open end of cap tube parts of the caps. Each of the terminal group splices is inserted into a respective cap and secured thereto by tape which is wound around the taping flange and wires. The planar support member is then attached to the trunk wires by wrapping around the trunk wires or being placed over and attached to one part of the perimeter of the trunk wires.

In this construction of the present invention, the caps, which cover the terminal group splices, are formed as integral parts of the planar support member. Therefore, placing each terminal group splice within a cap allows multiple terminal group splices to be collectively protected by a single protector cover. Also, by wrapping the planar support member (to which multiple caps are attached)

around the circumference of the trunk wires, or by attaching the planar support member to one part of the circumference of the trunk wires, the wiring harness takes up less space and thus allows the trunk wires to be more easily routed through smaller spaces.

An aspect of the present invention provides a protector cover that protects multiple terminal group splices of wires branching off of trunk wires of a wire harness, the protector cover including a support member; a plurality of caps arranged in alignment at intervals on a surface of the planar support member, each of the caps configured to receive one of the terminal group splices; and a taping flange adjacent the caps; wherein each of the terminal group splices may be inserted into a respective one of the caps and secured thereto by winding tape around the taping flange and the wires, and the support member may be attached to the perimeter of the trunk wires. Further, the support member includes a planar member. Additionally, the support member includes a flexible planar member configured to be attached to the perimeter of the trunk wires by wrapping therearound. Further, the plurality of caps are arranged at intervals on first and second surfaces of the support member; and the cap includes a cap tube having an open end; wherein the taping flange extends from the open ends of the cap tubes. the caps may be formed unitarily and in one piece with the support member; the support member may include a curved strip member. Additionally, the support member includes a curved strip member configured to be attached to a portion of the perimeter of the trunk wires; each of the caps projecting from the support member, and each of the caps including a portion attached to a surface of the support member. Further, the support member includes a flexible planar member, the flexible planar support member being formed as a sheared predetermined length of a continuous belt. Each of the caps is formed separately, the protector cover further including a plurality of curved cap support arms provided in alignment at intervals on the support member to support the caps, the curved cap support arms configured to receive a respective cap inserted therein. In a further aspect of the present invention, the support member includes a flexible planar member, the flexible planar support member being formed as a sheared predetermined length of a continuous belt including a predetermined number of curved cap support arms. The support member includes a cross sectional C-shape; and the support member includes an elastic, preformed cross sectional C-shape, the C-shaped support member configured to be pressed over and elastically grip the circumference of the trunk wires. Further, each cap may include a cap tube having an open end; wherein the taping flange includes a plurality of taping flange portions, each taping flange portion extending from a respective open end of one of the cap tubes.

A further aspect of the present invention provides in combination, a wire harness; multiple terminal group splices of wires branching off of trunk wires of the wire harness; and a cover protector according.

A further aspect of the present invention provides a method of applying a protector cover to multiple terminal group splices of wires branching off of trunk wires of a wire harness, including inserting each terminal group splice into a respective cap provided on a protector cover; applying a tape to attach the terminal group splices inserted into respective caps to the protector cover; and attaching the protector cover with terminal group splices attached thereto to trunk wires of a wire harness. Further, the method may include applying a tape to attach the protector cover to the wire harness. Further, the method may include wrapping the protector cover with terminal group splices attached thereto around trunk wires of a wire harness. In a further aspect of the present invention, the method includes pressing the protector cover with terminal group splices attached thereto over trunk wires of a wire harness; and elastically gripping the circumference of trunk wires with the protective cover.

As previously noted, because the present invention provides a construction through which the caps, each of which covers and protects one terminal group splice, are formed as integral parts of the planar support member, placing a terminal group splice in each cap, with each cap being attached to the planar support member, allows a single protector cover to provide protection for multiple terminal group splices. Moreover, wrapping the planar support member (to which multiple caps are attached) around the circumference of the trunk wires, or placing the planar support member over one part of the circumference of the trunk wires, results in a more compact wiring harness, and thus allows the trunk wires to be routed through smaller spaces.

Furthermore, it is possible to initially manufacture the planar support members as part of a single continuous belt-like structure from which each planar support member can be cut to a length having the desired number of caps, thereby providing greater utility by eliminating the need to individually fabricate protector covers having a number of caps corresponding to the number of terminal group splices.

Moreover, each of the caps may be formed separately, and curved cap support arms may be formed in alignment at intervals on the flexible planar support member to support the caps inserted therein. This construction increases the utility of the protector cover because various size caps can be used to accommodate terminal group splices of various sizes, thus making it easier to place the caps over the terminal group splices.

Also, the planar support member may be formed to a C-shape in cross section, thus allowing the planar support member to be pressed onto and elastically grip the circumference of the trunk wires. This construction allows easy attachment of the planar support member to the trunk wires without the need for tape wrapping.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which:

FIGS. 10A through 10D illustrate a prior art protector cover.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The following will describe preferred embodiments of the invention with reference to the drawings. FIGS. 1 through 5 illustrate the first embodiment of the invention.

Figure 1:
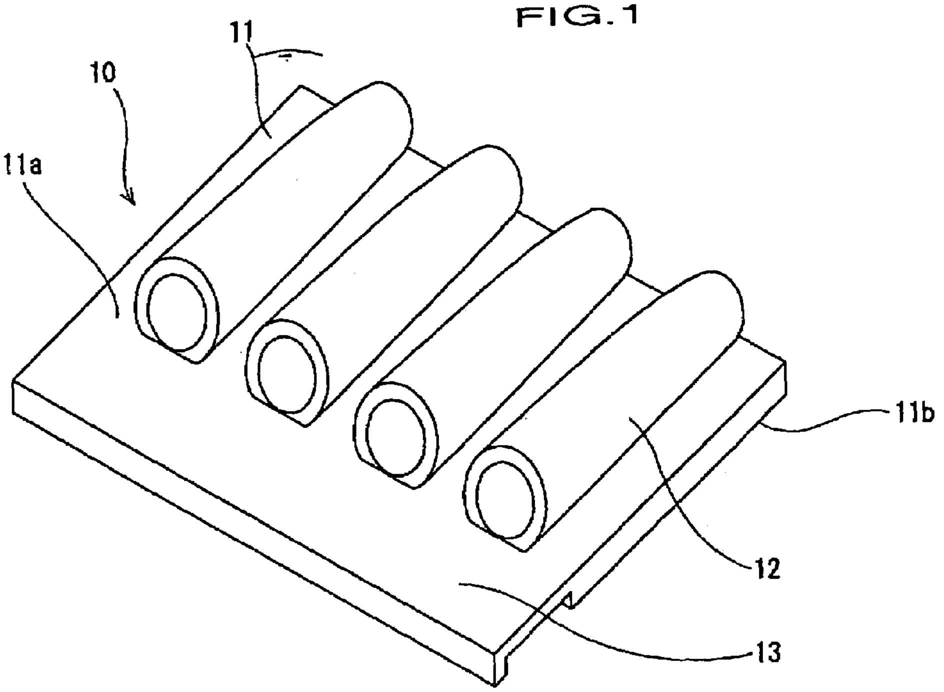
FIG. 1 is a perspective view of a terminal group splice protector cover of the first embodiment of the present invention.

As shown in FIG. 1, terminal group splice protector cover 10 (hereafter referred to as "protector cover 10") includes four cap tubes 12 provided on surface 11*a* of flexible planar support member 11, cap tubes 12 utilized as capping members placed over the terminal group splices. Cap tubes 12 are arranged along planar support member 11. One portion of each cap tube 12 may be fixedly joined to the planar support member 11. Lower surface 11*b* of planar support member 11 is an uninterrupted flat surface to which no cap tubes 12 are attached. One end of each cap tube 12 is open, and taping flange 13 is provided as the portion of planar support member 11 extending beyond the open end of cap tubes 12. Taping flange 13 is a single flange that extends along the entire length of planar support member 11 from one side of cap tubes 12 to the other.

Figure 2:
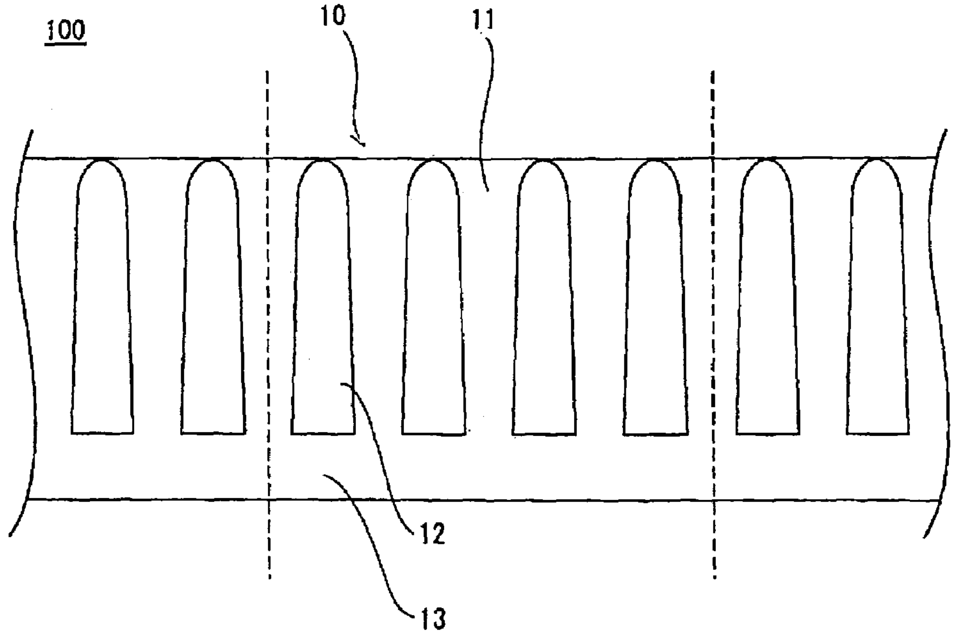
FIG. 2 is a plan view of a continuous belt before the splice protector cover of the embodiment of FIG. 1 is sheared off.

Protector cover 10, as shown in FIG. 2, may be formed by shearing off a portion of continuous belt 100, on which multiple cap tubes 12 are provided at predetermined intervals, to a desired length. The protector cover 10 may be formed with any suitable number of cap tubes 12 and in the present embodiment, a protector cover 10 containing four cap tubes 12 is provided by shearing continuous belt 100 at the locations indicated by the broken lines in the drawing.

Figure 3:
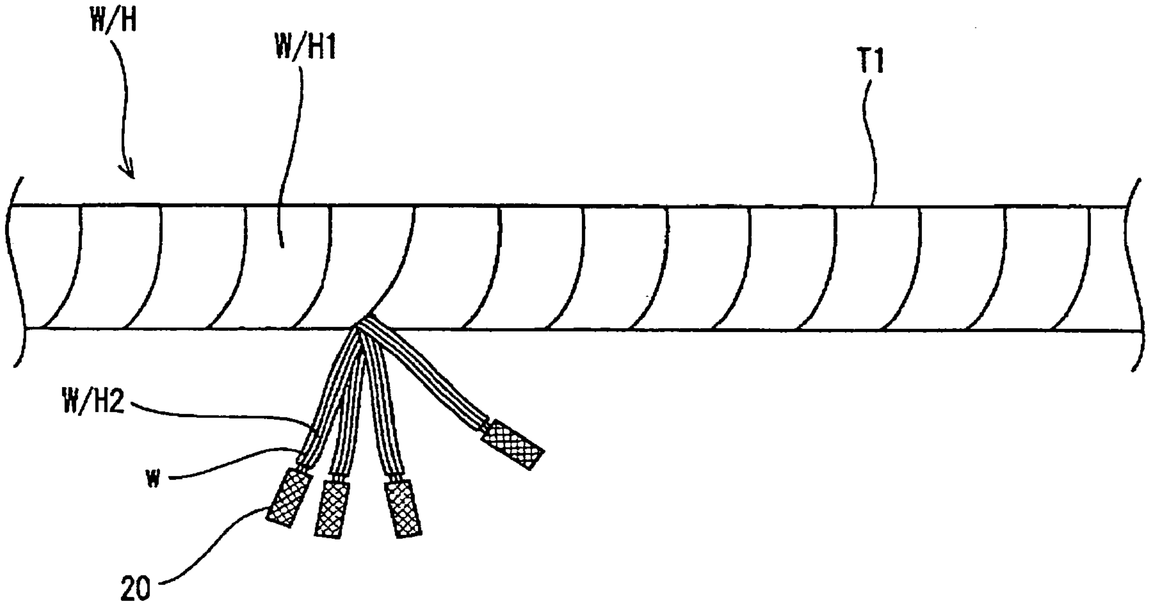
FIG. 3 is a view of the branch wires where they separate from the trunk wires of the wiring harness in the embodiment of FIG. 1.

FIG. 3 illustrates wire harness W/H to which protector cover 10 is to be attached. Four groups of branch wires W/H2 separate from tape-wrapped trunk wires W/H1, each group of branch wires WH2 being formed of multiple electrical wires 'w' which have the ends of their core conductors soldered together to form terminal group splice 20.

Figure 4A:
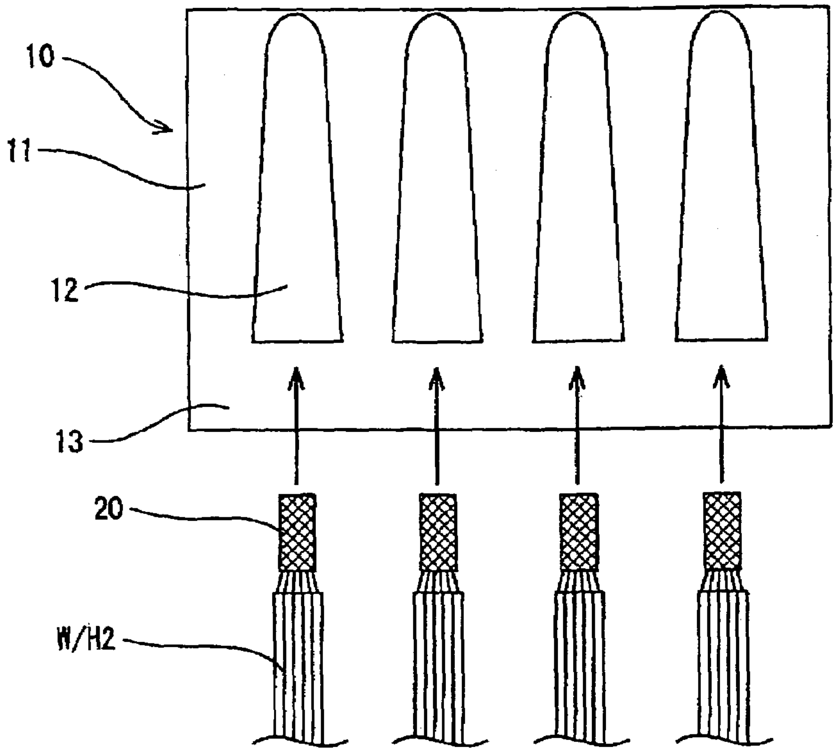
FIGS. 4A and 4B illustrate the sequence in which the splice protector cover of the embodiment of FIG. 1 is attached to the branch wires.
Figure 4B:
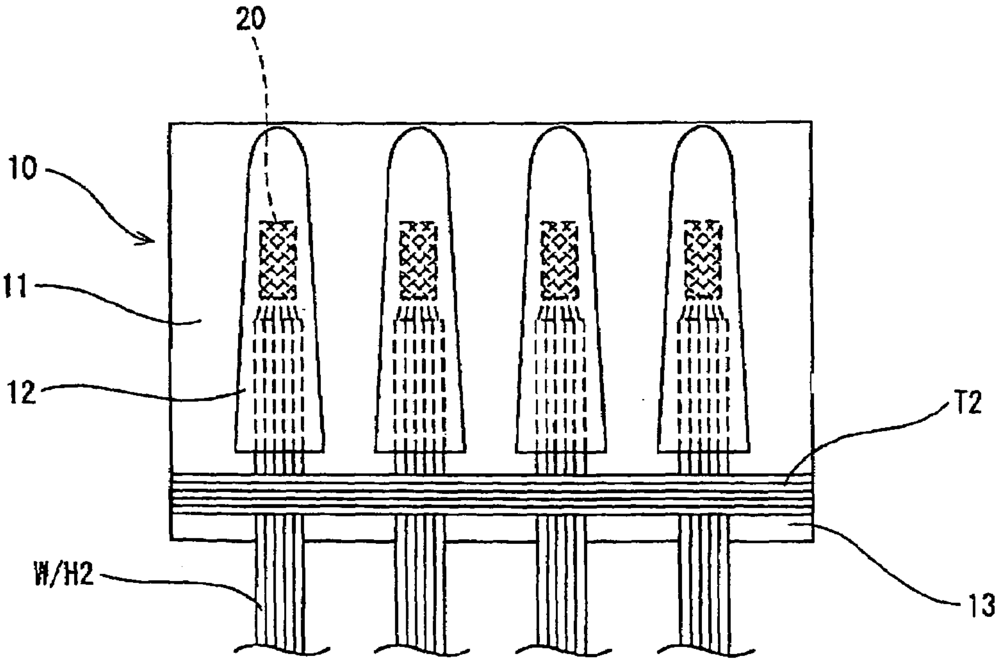

The following will describe the method by which protector cover 10 is attached to wire harness W/H. First, as illustrated in FIG. 4A, each terminal group splice 20 is inserted into the open end of a respective cap tube 12 on protector cover 10. FIG. 4B shows how tape T2 is applied to attach protector cover 10 to wire harness W/H by wrapping around all four groups of branch wires WH2 and taping flange 13 to secure branch wires WH2, thus securing group splices 20 within cap tubes 12 of protector cover 10.

Figure 5A:
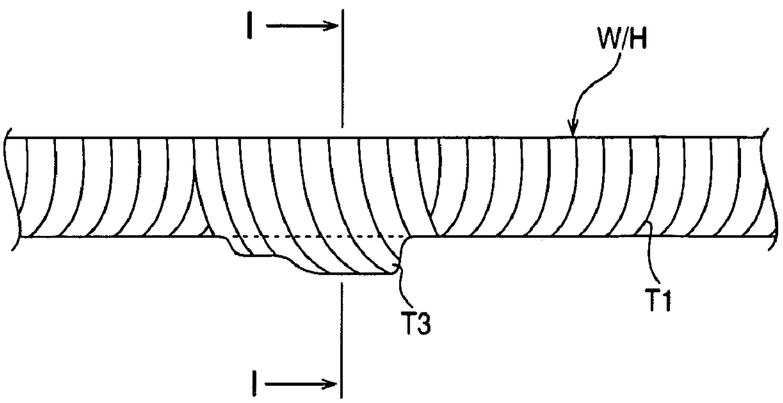
FIG. 5A is a plan view of the splice protector cover of the embodiment of FIG. 1 attached to the trunk wires.
Figure 5B:
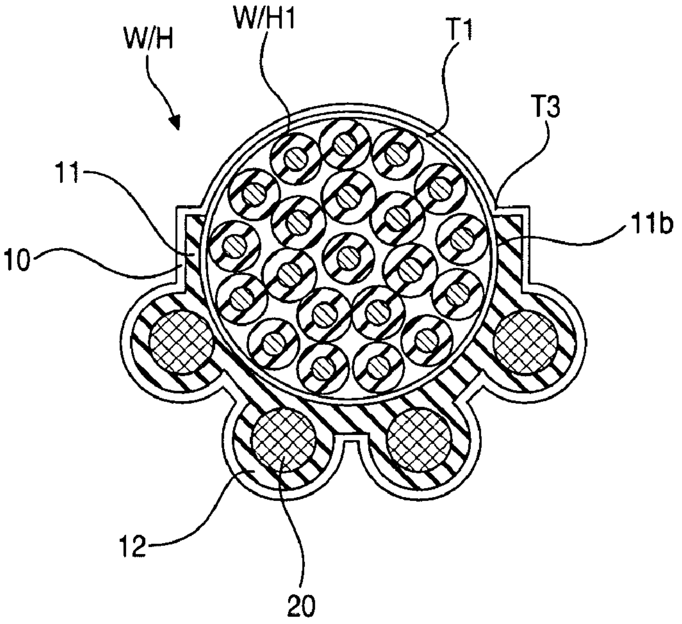
FIG. 5B is a cross sectional view taken at line I—I of FIG. 5A.

Next, as shown in FIGS. 5A and 5B, lower surface 11*b* of planar support member 11 is placed along the circumference of trunk wires W/H1 after which tape T3 is wrapped around trunk wires W/H1, branch wires W/H2, and protector cover 10 so that protector cover 10 is bound to trunk wires W/H1 to become a single structure therewith.

Because the above described structure of the present invention utilizes cap tubes, which are provided on the planar support member 11, to cover each group splice 20, each group splice 20 is housed within its own cap tube 12 which is attached to planar support member 11, thus allowing group splices 20 to be collectively covered and protected with a single protector cover. Cap tubes 12 may be formed unitarily and in one piece with the planar support member 11. Also, the flexible property of protector cover 10 allows it to be wrapped around the circumference of trunk wires W/H1, thus forming a more compact wire harness that allows the trunk wires to be routed through smaller spaces. Further, because protector cover 10 is initially formed as part of continuous belt 100, planar support member 111 may be cut to a length having the desired number of cap tubes, thereby widening application and eliminating the need to manufacture each protector cover 10 with a specific number of cap tubes corresponding to the number of group splices 20.

Figure 6:
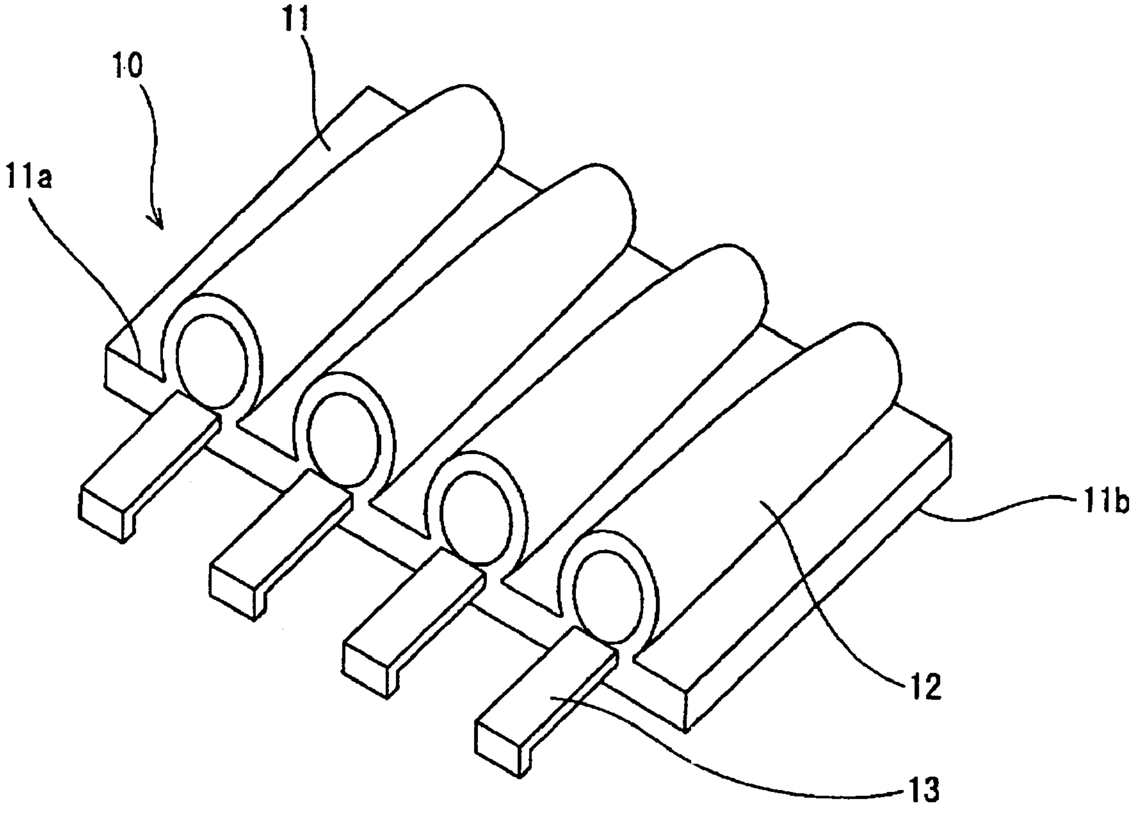
FIG. 6 is a perspective view of a modified version of the terminal group splice protector cover of the embodiment of FIG. 1.

FIG. 6 illustrates a modified version of the first embodiment of the present invention in which a separate tape wrapping flange is formed on each cap tube.

Figure 7:
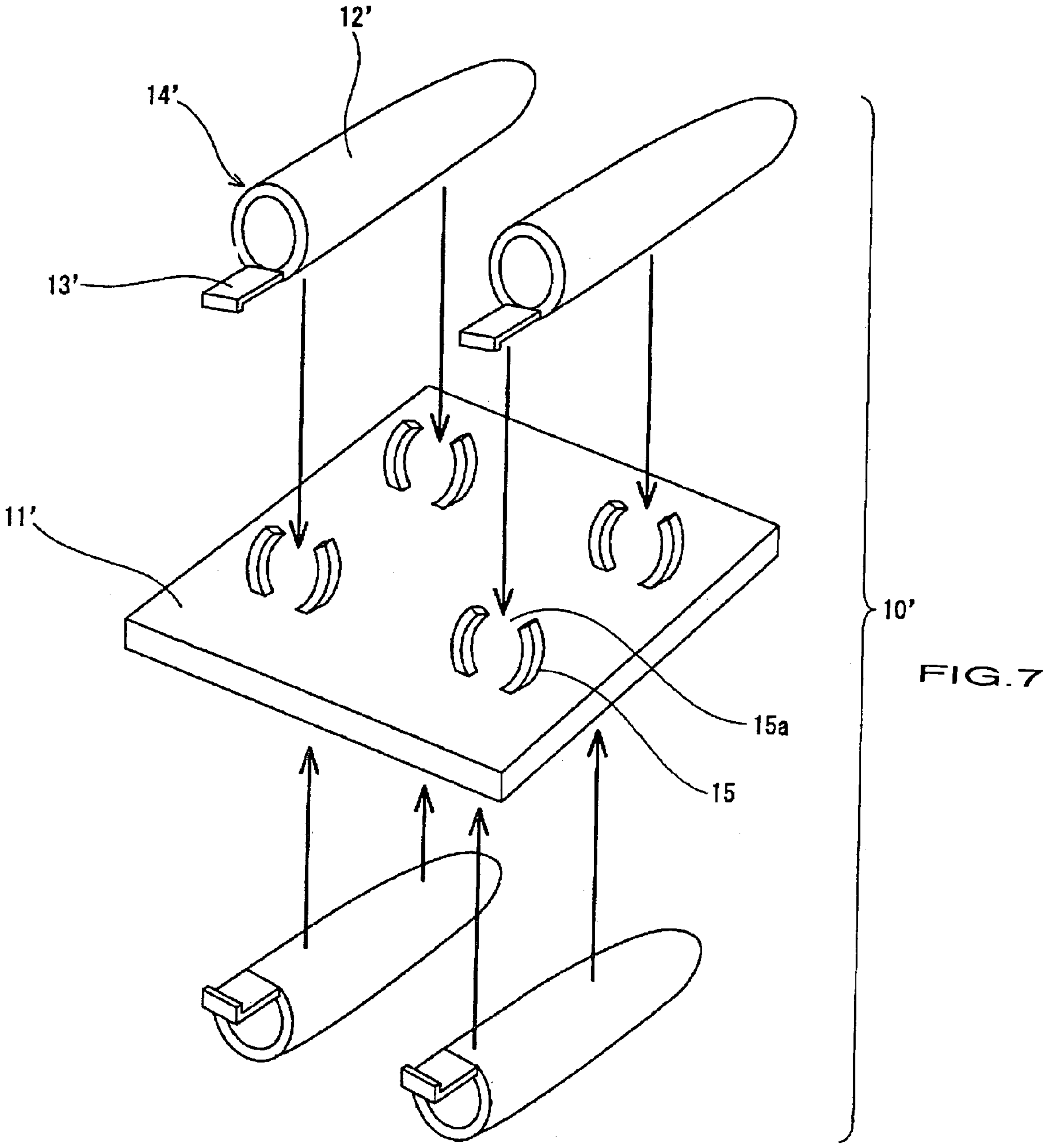
FIG. 7 is a perspective view of a protector cover of a second embodiment of the present invention.
Figure 8:
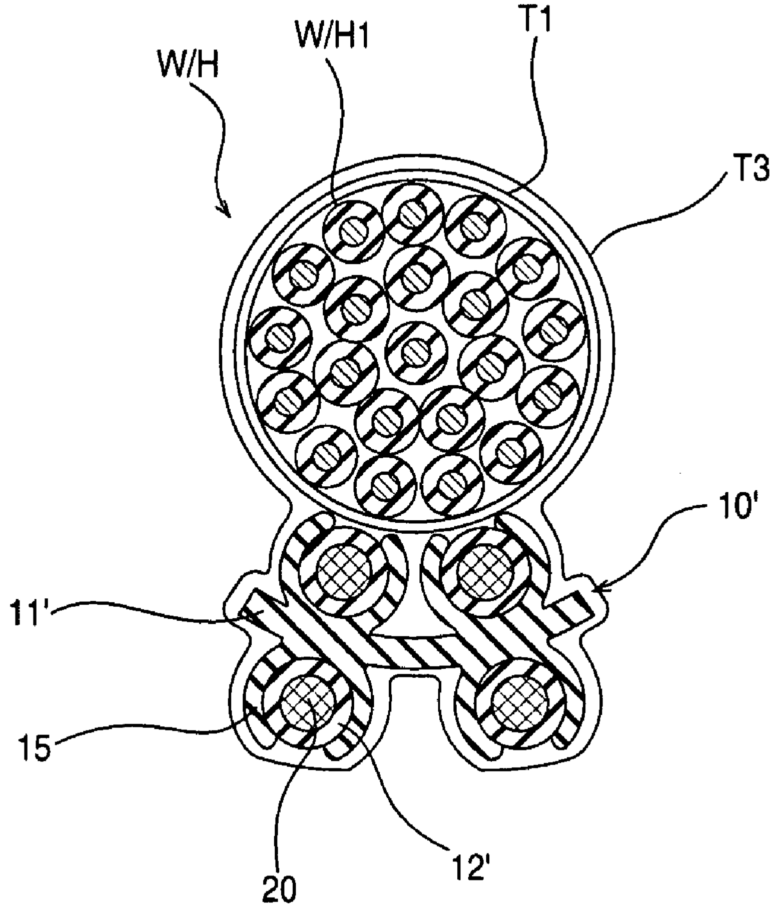
FIG. 8 is a cross sectional view of the protector cover of the embodiment of FIG. 7 attached to the trunk wires.

FIGS. 7 and 8 illustrate a second embodiment of the present invention wherein protector cover 10' is constructed from separately formed planar support member 111' and caps 14'. Curved cap support arms 15, which are formed on both sides of flexible planar support member 11', is not a continuous member as each end of the support arms terminates at a point forming cap insertion space 15*a*. This embodiment of the present invention provides pairs of cap support arms 15 which are aligned along the lengthwise direction of caps 14 on planar support member 11'. Further, in the present invention, one cap 14' is supported by two pairs of cap support arms 15, and two caps 14' are supported on one side and two on the other, thus providing a total of four caps 14' supported on planar support member 11'. The planar support member 11' may include any suitable number of support arms 15. Moreover, in a structure similar to that noted in the first embodiment, protector cover 10' may be cut from a continuous belt on which cap support arms 15 are formed.

Cap 14', which covers group splice 20 at the terminal end of the electrical wires, includes taping flange 13' that extends outward from the open end of cap tube 12'.

The following will explain the method through which protector cover 10' is attached to wire harness W/H. First, branch wire terminal group splice 20 is inserted into the open end of cap tube 12' of cap 14', and tape is wrapped around taping flange 13' and the wires to secure the terminal ends of the branch wires within cap 14'. Each cap 14', with the branch wire terminal ends attached, is then pressed between cap support arms 15, through cap insertion space 15*a*, and supported therein. Lastly, as shown in FIG. 8, protector cover 10', to which the branch wires are attached, is placed over part of the circumference of trunk wires W/H1, and tape T3 is wound around trunk wires WH1, the branch wires, and protector cover 10' in order to attach protector cover 10' to the circumference of trunk wires W/H1.

The above-noted structure makes it possible to collectively protect multiple terminal group splices 20 with one protector cover due to planar support member 11' having integrally formed cap support arms 15 which support caps 14', each of which covers a terminal group splice 20. Moreover, by attaching protector cover 10' to a part of the circumference of trunk wires W/H1, the trunk wires take up less space and can thus be routed through smaller spaces during installation. Furthermore, because terminal group splice 20 may be inserted into cap 14' before cap 14' is inserted into cap support arms 15, the operation through which cap 14' is attached to the branch wire terminal end is simplified.

Because the cap support arms may be used to attach caps of varying size, the caps need not be made to a uniform size, but may be fabricated to match the size of the corresponding terminal end splice. Further, the taping flange need not be constructed as part of the cap, but may be integrally formed as part of the planar support member so as to wrap around all of the group spliced branch wires. Because other functions of this second embodiment are similar to those of the first embodiment, descriptions of components and mechanisms of the two embodiments identified with the same element numbers have been omitted.

Figure 9A:
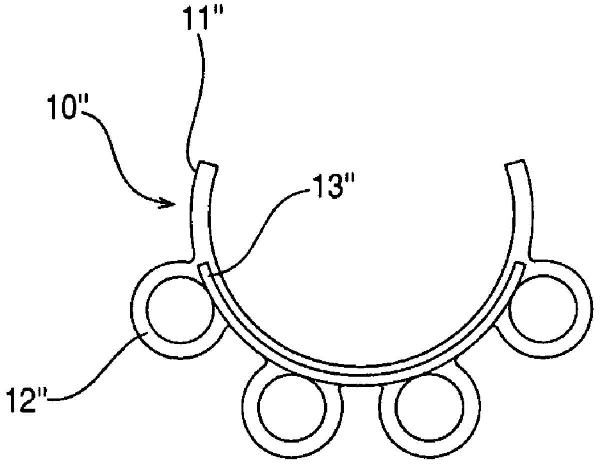
FIG. 9A is a front view of a protector cover of a third embodiment of the present invention.

FIG. 9 describes a third embodiment of the invention wherein protector cover 10" has essentially the same structure as the other embodiments except for being C-shaped in cross section. Planar support member 11", on which cap tubes 12" are formed on the external perimeter, has a diameter slightly smaller than the diameter of trunk wires W/H1.

Figure 9B:
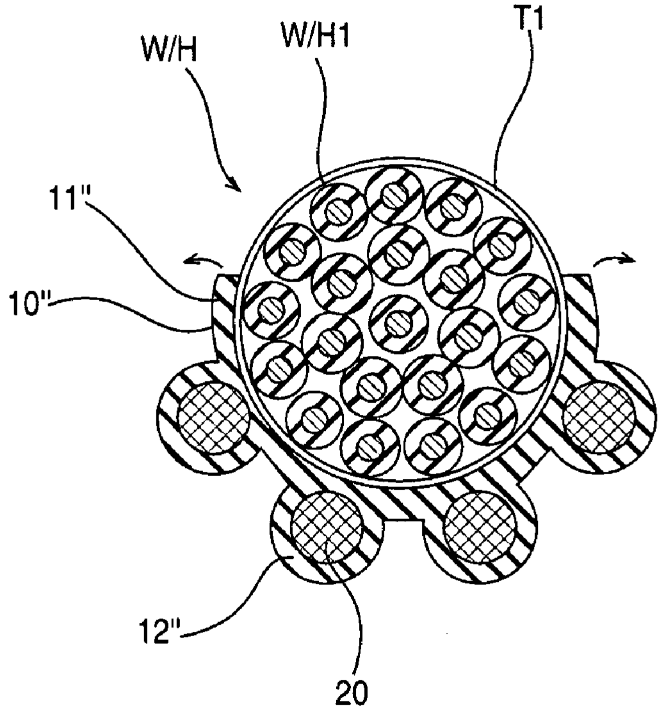
FIG. 9B is a cross sectional view of the protector cover of the embodiment of FIG. 9A attached to the trunk wires.

Protector 10" is attached to the branch wire terminal ends in the same manner as described in the first embodiment, and as illustrated in FIG. 9B, is able to elastically grip the circumference of trunk wires W/H1 when pressed thereon.

This third embodiment provides the same functional advantages of the first embodiment but eliminates the need to secure protector cover 10" with a tape wrapping due to C-shaped planar support member 11" attaching by gripping the perimeter of trunk wires W/H1. Because the other functions of this third embodiment are essentially similar to those of the first embodiment, descriptions of components and mechanisms of the two embodiments identified with the same element numbers have been omitted.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A protector cover that protects multiple terminal group splices of wires branching off of trunk wires of a wire harness, said protector cover comprising:

a support member having an upper and lower surface, wherein said lower surface of said support member is configured to contact a perimeter of the trunk wires;

a plurality of caps arranged in alignment at intervals on said upper surface of said support member, each of said caps configured to receive one of the terminal group splices; and a taping flange adjacent said caps;

wherein each of the terminal group splices may be inserted into a respective one of said caps and secured thereto by winding tape around said taping flange and the wires, and said support member may be attached to the perimeter of the trunk wires.

2. The protector cover according to claim 1, wherein said support member comprises a planar member.

3. The protector cover according to claim 1, each said cap comprising:

a cap tube having an open end;

wherein said taping flange extends from said open ends of said cap tubes.

4. The protector cover according to claim 1, wherein said caps are formed unitarily and in one piece with said support member.

5. The protector cover according to claim 1, wherein said support member comprises a curved strip member.

6. The protector cover according to claim 1, wherein said support member comprises a curved strip member configured to be attached to a portion of the perimeter of the trunk wires.

7. The protector cover according to claim 1, each of said caps projecting from said support member, and each of said caps comprising a portion attached to a surface of said support member.

8. The protector cover according to claim 1, wherein said support member comprises a flexible planar member, said flexible planar support member being formed as a sheared predetermined length of a continuous belt.

9. The protective cover according to claim 1 wherein said support member comprises a cross sectional C-shape.

10. The protective cover according to claim 1, wherein said support member comprises an elastic, preformed cross sectional C-shape, said C-shaped support member configured to be pressed over and elastically grip the circumference of the trunk wires.

11. The protective cover according to claim 1, each said cap comprising:

a cap tube having an open end;

wherein said taping flange comprises a plurality of taping flange portions, each taping flange portion extending from a respective open end of one of said cap tubes.

12. In combination, a wire harness;

multiple terminal group splices of wires branching off of trunk wires of said wire harness; and a cover protector according to claim 1.

13. A protector cover that protects multiple terminal group splices of wires branching off of trunk wires of a wire harness, said protector cover comprising:

a support member having an upper and lower surface, a plurality of caps arranged in alignment at intervals on the lower surface of said support member, each of said caps configured to receive one of the terminal group splices; and a taping flange adjacent said caps;

wherein each of the terminal group splices may be inserted into a respective one of said caps and secured thereto by winding tape around said taping flange and the wires, and said support member may be attached to the perimeter of the trunk wires wherein said plurality of caps are arranged at intervals on said upper and lower surfaces of said support member.

14. A protector cover that protects multiple terminal group splices of wires branching off of trunk wires of a wire harness, said protector cover comprising:

a support member;

a plurality of caps arranged in alignment at intervals on a surface of said support member, each of said caps configured to receive one of the terminal group splices; and a taping flange adjacent said caps;

wherein each of the terminal group splices may be inserted into a respective one of said caps and secured thereto by winding tape around said taping flange and the wires, and said support member may be attached to the perimeter of the trunk wires, wherein each of said caps is formed separately, said protector cover further comprising:

a plurality of curved cap support arms provided in alignment at intervals on said support member to support said caps, said curved cap support arms configured to receive a respective cap inserted therein.

15. The protective cover according to claim 14, wherein said support member comprises a flexible planar member, said flexible planar support member being formed as a sheared predetermined length of a continuous belt including a predetermined number of curved cap support arms.

* * * * *